(12) United States Patent
Takeda et al.

(10) Patent No.: US 11,489,579 B2
(45) Date of Patent: Nov. 1, 2022

(54) TERMINAL, RADIO COMMUNICATION METHOD, AND SYSTEM FOR BEAM FAILURE RECOVERY

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 30 days.

(21) Appl. No.: 16/970,776

(22) PCT Filed: Feb. 19, 2018

(86) PCT No.: PCT/JP2018/005813
§ 371 (c)(1),
(2) Date: Aug. 18, 2020

(87) PCT Pub. No.: WO2019/159376
PCT Pub. Date: Aug. 22, 2019

(65) Prior Publication Data
US 2021/0099216 A1    Apr. 1, 2021

(51) Int. Cl.
*H04W 72/04* (2009.01)
*H04B 7/06* (2006.01)
*H04W 76/19* (2018.01)
*H04W 24/08* (2009.01)
*H04W 80/02* (2009.01)

(52) U.S. Cl.
CPC .......... *H04B 7/0695* (2013.01); *H04W 24/08* (2013.01); *H04W 72/042* (2013.01); *H04W 72/0446* (2013.01); *H04W 72/0493* (2013.01); *H04W 76/19* (2018.02); *H04W 80/02* (2013.01)

(58) Field of Classification Search
CPC ......... H04W 72/0493; H04W 72/0446; H04W 72/042; H04W 76/19; H04W 24/08; H04W 80/02; H04B 7/0695
See application file for complete search history.

(56) References Cited

U.S. PATENT DOCUMENTS

| 2017/0331577 | A1* | 11/2017 | Parkvall | H04W 4/00 |
| 2019/0254042 | A1* | 8/2019 | Cirik | H04W 74/004 |
| 2020/0245395 | A1* | 7/2020 | Zhang | H04L 5/0053 |
| 2020/0374960 | A1* | 11/2020 | Deenoo | H04W 72/1284 |

OTHER PUBLICATIONS

Extended European Search Report issued in counterpart European Patent Application No. 18906490.0, dated Aug. 18, 2021 (7 pages).
(Continued)

*Primary Examiner* — Wei Zhao
(74) *Attorney, Agent, or Firm* — Osha Bergman Watanabe & Burton LLP

(57) ABSTRACT

A terminal is disclosed including a transmitter that transmits a beam failure recovery request signal; and a processor that maintains, in a beam failure recovery procedure including the transmission of the beam failure recovery request signal, monitoring of downlink control information for a random access. In other aspects, a radio communication method and a base station are also disclosed.

6 Claims, 10 Drawing Sheets

(56) References Cited

OTHER PUBLICATIONS

NTT DOCOMO; "Remaining issues on beam recovery"; 3GPP TSG RAN WG1 Meeting AH 1801, R1-1800661; Vancouver, Canada; Jan. 22-26, 2018 (5 pages).

MediaTek Inc.; "Clarifications on Beam Failure Recovery"; 3GPP TSG RAN WG1 Meeting AH1801, R1-1800160; Vancouver, Canada; Jan. 22-26, 2018 (4 pages).

International Search Report issued in PCT/JP2018/005813 dated May 1, 2018 (2 pages).

Written Opinion of the International Searching Authority issued in PCT/JP2018/005813 dated May 1, 2018 (4 pages).

Samsung; "Issues on Beam failure recovery"; 3GPP TSG RAN WG1 Meeting AH 1801, R1-1800434; Vancouver, Canada; Jan. 22-26, 2018 (19 pages).

Nokia, Nokia Shanghai Bell; "On DCI formats subclause in 38.212"; 3GPP TSG RAN WG1 Meeting AH 1801, R1-1800938; Vancouver, Canada; Jan. 22-26, 2018 (37 pages).

NTT DOCOMO, INC.; "Remaining issues on beam recovery"; 3GPP TSG RAN WG1 Meeting #92, R1-1802472; Athens, Greece; Feb. 26-Mar. 2, 2018 (5 pages).

MediaTek Inc.; "Further Details on Beam Failure Recovery"; 3GPP TSG RAN WG1 Meeting #91, R1-1719566; Reno, USA; Nov. 27-Dec. 1, 2017 (37 pages).

MediaTek Inc.; "Summary for Remaining issues on Beam Failure Recovery"; 3GPP TSG RAN WG1 Meeting #90b, R1-1718878; Prague, Czechia; Oct. 9-13, 2017 (38 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Japanese Application No. 2020-500250 dated May 10, 2022 (8 pages).

Mediatek, Inc., "Offline discussion summary on remaining issues on Beam Failure Recovery", 3GPP TSG RAN WG1 Meeting #91, R1-1721699, Reno, USA, Nov. 27-Dec. 1, 2017 (22 pages).

Ericsson, "Remaining Issues on Search Spaces", 3GPP TSG RAN WG1 Meeting#92, R1-1802903, Athens, Greece, Feb. 26-Mar. 2, 2018 (12 pages).

* cited by examiner

TERMINAL, RADIO COMMUNICATION METHOD, AND SYSTEM FOR BEAM FAILURE RECOVERY

TECHNICAL FIELD

The present disclosure relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, for the purpose of achieving further broadbandization and increased speed beyond LTE, successor systems of LTE (referred to as, for example, "LTE-A (LTE-Advanced)," "FRA (Future Radio Access)," "4G," "5G," "5G+ (plus)," "NR (New RAT)," "3GPP ($3^{rd}$ Generation Partnership Project) Rel. 14, 15, 16 (and/or later versions)," and so on) are under study.

In existing LTE systems (LTE Rel. 8 to 13), the quality of a radio link is subject to monitoring (RLM (Radio Link Monitoring)). When a radio link failure (RLF) is detected based on RLM, a user terminal (UE (User Equipment)) is required to re-establish the RRC (Radio Resource Control) connection.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 or later versions, NR, 5G, etc.) research is underway to allow communication using beamforming (BF). An environment in which BF is used is more susceptible to the impact of blockage due to obstacles, and so radio link failures (RLFs) might occur frequently. When an RLF occurs, it is necessary to re-establish the RRC connection, and therefore frequent occurrence of RLFs might lead to a decline in system throughput.

So, envisaging such future radio communication systems, research is underway to reduce the occurrence of RLFs by performing procedures for detecting beam failures (BFs) and switching to other beams (also referred to as "beam failure recovery (BFR) procedures," "beam recovery procedures," etc.).

However, in future radio communication systems where the beam failure recovery (BFR) procedures are performed, there is a possibility that the behaviors of a user terminal (UE behaviors) (for example, monitoring of a specific DCI and/or the handling of a timer that is active at the time the BFR procedures are started) cannot be controlled properly in the BFR procedures.

The present invention has been made in view of the above, and it is therefore an object of the present invention to provide a user terminal and a radio communication method that allow adequate control of behaviors in beam failure recovery (BFR) procedures.

Solution to Problem

In accordance with one aspect of the present invention, a user terminal has a transmission section that transmits a beam failure recovery request signal to a radio base station, a receiving section that receives a response signal in response to the recovery request signal, from the radio base station, and a control section that controls beam failure recovery procedures, including at least transmitting the recovery request signal and receiving the response signal, and the control section maintains monitoring of specific downlink control information in the beam failure recovery procedures.

In accordance with another aspect of the present invention, a user terminal has a transmission section that transmits a beam failure recovery request signal to a radio base station, a receiving section that receives a response signal in response to the recovery request signal, from the radio base station, and a control section that controls beam failure recovery procedures, including at least transmitting the recovery request signal and receiving the response signal, and, if monitoring of downlink control information to include a slot format indicator is not allowed in the beam failure recovery procedures, the control section determines the slot format based on at least one of higher layer signaling, downlink control information for scheduling the response signal, and a resource for random access.

Advantageous Effects of Invention

One aspect of the present invention allows adequate control of behaviors in beam failure recovery (BFR) procedures.

DESCRIPTION OF EMBODIMENTS

Figure 1:
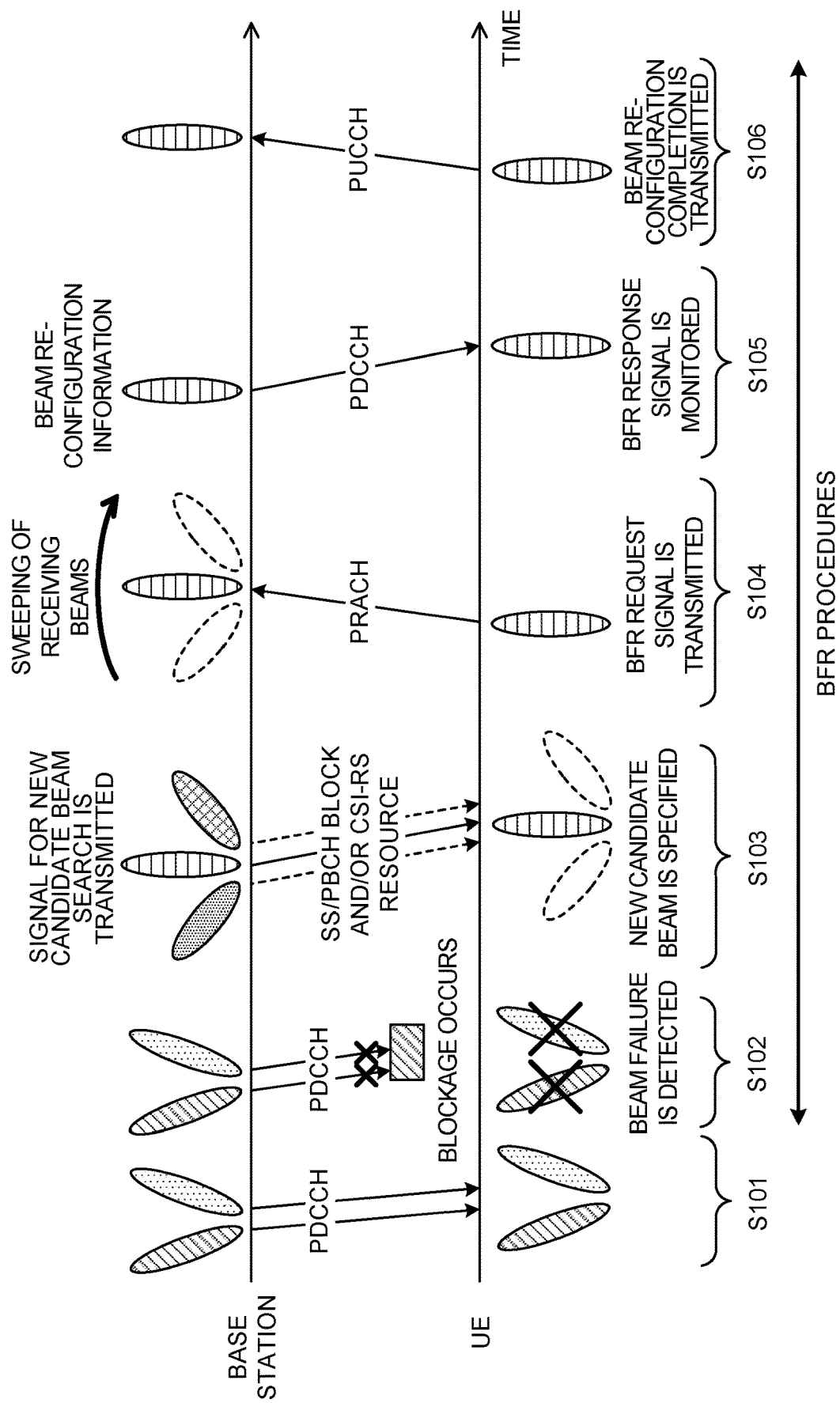
FIG. 1 is a diagram to show an example of BFR procedures.

Envisaging future radio communication systems (for example, LTE Rel. 14 or later versions, NR, 5G, etc.), study is underway to employ procedures in which a user terminal reconfigures links (beams) in the physical layer (PHY layer, L1, etc.) and/or the MAC (Medium Access Control) layer, in order to reduce the occurrence of radio link failures (RLFs) in higher layers (for example, the RRC (Radio Resource Control) layer). These procedures are also referred to as "link reconfiguration procedures," "beam failure recovery (BFR) procedures," "L1/L2 beam recovery," "beam recovery," and so forth.

The user terminal receives configuration information, which includes at least one of information that shows resources for detecting beam failures (BFs) (and that is also referred to as "BF detection resource information") and information that shows resources for measuring radio links (candidate beams) that serve as switching candidates (and that is also referred to as "candidate beam information") by higher layer signaling (for example, RRC signaling).

The BF detection resource information is also referred to as, for example, "Beam-Failure-Detection-RS-ResourceConfig," "failureDetectionResources" and so forth, and may represent a set comprised of one or more resources (BF detection resources) for a downlink reference signal (for example, a channel state information reference signal (CSI-RS)) that is configured in a predetermined cycle.

The candidate beam information is also referred to as "Candidate-Beam-RS-List," "Candidate-Beam-RS-Identification-Resource," "beamFailureCandidateBeamResource" and so forth, and may represent a set comprised of one or more resources (measurement resources) for a downlink reference signal (for example, a CSI-RS and/or a synchronization signal/broadcast channel (SS/PBCH (Synchronization Signal/Physical Broadcast CHannel)) block) that is configured for radio link measurements. The SS/PBCH block is a signal block that includes an SS and/or a PBCH.

If the above BF detection resource information is not configured in the user terminal, the user terminal may select a set comprised of one or more resources for a downlink reference signal (for example, a CSI-RS and/or an SS/PBCH block) that is associated with a downlink control channel (for example, PDCCH (Physical Downlink Control CHannel)), as BF detection resources.

Note that the "downlink reference signal associated with the PDCCH" may be a CSI-RS resource and/or an SS/PBCH block that are quasi-co-located (QCL (Quasi-Co-Location)) with the demodulation reference signal (DM-RS) for the PDCCH, which is monitored in a control resource set (CORESET). This relationship based on QCL may be indicated by the state of a transmission configuration indicator (TCI) (TCI state), and the above "downlink reference signal associated with the PDCCH" may be a CSI-RS resource and/or an SS/PBCH block that show the same TCI state as that of the DMRS for the PDCCH.

In BFR procedures, the PHY layer in the user terminal assesses the radio link quality of a BF detection resource set based on a predetermined threshold (for example, $Q_{out,LR}$). This predetermined threshold may be determined based on higher layer parameters (for example, RLM-IS-OOS-thresholdConfig and/or Beam-failure-candidate-beam-threshold). Using the set of BF detection resources, the user terminal may assess the radio link quality of a periodic CSI-RS resource or SS/PBCH block that is quasi-co-located with the DM-RS for the PDCCH monitored by the user terminal.

Furthermore, the user terminal may use a predetermined threshold (for example $Q_{in,LR}$) for the periodic CSI-RS resource. The user terminal may scale the transmission power for the SS/PBCH block, which is determined based on a predetermined higher layer parameter (for example, Pc_SS), and then apply the above predetermined threshold (for example, $Q_{out,LR}$) to the SS/PBCH block.

When, in a slot where the radio link quality of the BF detection resource set is assessed, the radio link quality of all slots in this set is poorer than a predetermined threshold (for example, $Q_{out,LR}$), the physical layer of the user terminal may send a predetermined indication to higher layers (for example, the MAC layer or the RRC layer). This predetermined indication may be referred to as a "beam failure instance indicator," a "beam failure instance," and so forth.

Furthermore, the user terminal may report information (new candidate beam information) that shows a resource (for example, a periodic CSI-RS resource and/or PBCH block) that is selected from a set of measurement resources, to higher layers (for example, the MAC layer or the RRC layer).

One or more CORESETs are reported (configured) from the radio base station to the user terminal by using a higher layer parameter (for example, Beam-failure-Recovery-Response-CORESET). Using the higher layer parameter (for example, Beam-failure-recovery-request-RACH-Resource), the user terminal may receive the transmission configuration (resource) for a random access channel (PRACH (Physical Random Access CHannel)).

The user terminal may monitor DCI, to which cyclic redundancy check (CRC) bits, scrambled by using a C-RNTI (Cell-Radio Network Temporary Identifier), are appended, after a predetermined number of slots (for example, four slots) from the slot in which the PRACH is transmitted, in a window (also referred to as a "response window," a "gNB response window," etc.) that is configured by a higher layer parameter (for example, Beam-failure-recovery-request-window), and receive the PDSCH, via an antenna port, in a CORESET that is configured by a higher layer parameter (for example, Beam-failure-Recovery-Response-CORESET), based on the DMRS for the PDCCH that is quasi-co-located with the above-noted resource (for example, a periodic CSI-RS resource or SS/PBCH block) indicated by the new candidate beam information.

FIG. 1 is a diagram to show an example of BFR procedures. The number of beams and the like are examples and not limiting. In the initial state in FIG. 1 (step S101), the user terminal receives PDCCHs transmitted from a radio base station by using two beams. Each PDCCH's DMRS may be associated with a BF detection resource (for example, a CSI-RS resource and/or an SS/PBCH block).

In step S102, when the radio waves from the radio base station are blocked, the user terminal cannot detect the PDCCHs. Such blockage might occur due to, for example, the impacts of obstacles between the user terminal and the radio base station, fading, interference and so forth.

When a predetermined condition is fulfilled, the user terminal may detect a beam failure and start the BFR procedures. For example, referring to FIG. 1, if the radio link quality of BF detection resources, associated with each PDCCH's DMRS, is poorer than a predetermined threshold (for example, $Q_{out,LR}$), the user terminal may detect a beam failure.

The radio base station may judge that the user terminal has detected a beam failure when no report arrives from the user terminal, or the radio base station may judge that a beam failure has been detected when a predetermined signal (beam recovery request in step S104) is received from the user terminal.

In step S103, the user terminal starts a search for new candidate beams to use for communication. To be more specific, when the user terminal detects a beam failure, the user terminal performs measurements based on measurement resources (for example, CSI-RS resources and/or SS/PBCH resources) configured by higher layer signaling, and identify one or more new candidate beams that are desirable (that show good quality, for example). In this example, one beam is identified as a new candidate beam.

In step S104, the user terminal, having identified a new candidate beam, transmits a beam failure recovery (BFR) request. The BFR request may be transmitted in the PRACH, by using, for example, a resource that is configured by a higher layer parameter (for example, Beam-failure-recovery-request-RACH-Resource). A BFR request may be referred to as a "beam recovery request," a "beam recovery request signal," a "BFR request signal," and so forth.

The BFR request may include information (new candidate beam information) that represents the new candidate beam identified in step S103 (or resources for measuring the new candidate beam). The new candidate beam information may be at least one of the beam index (BI)), a predetermined reference signal's port and/or resource index (for example, a CSI-RS resource indicator (CRI)), and an SS/PBCH block.

In step S105, the radio base station, having detected the BFR request, transmits a response signal (BFR response signal) in response to the BFR request from the user terminal. This response signal may include reconfiguration information (for example, the BF detection resource information and/or the candidate beam information that have been described earlier) for one or more beams (links).

The user terminal may monitor DCI in a CORESET configured by a higher layer parameter (for example, Beam-failure-Recovery-Response-CORESET), and receive the response signal using the PDSCH scheduled by that DCI. The user terminal may determine which transmitting beams and/or receiving beams are to use, based on the beam (link) reconfiguration information.

In step S106, the user terminal may transmit, to the radio base station, a message to indicate that beam (link) reconfiguration has been completed.

The success of BFR may refer to, for example, the case in which step S106 is reached. On the other hand, the failure of BFR may refer to, for example, the case in which no candidate beam is identified in step S103.

Note that the index numbers of these steps are just numbers for illustrative purposes, and several steps may be put together, or re-ordered.

A problem with future radio communication systems in which the above-described BFR procedures are performed is how a user terminal's behaviors (UE behaviors) (for example, the monitoring of a specific DCI and/or the handling of a timer that is active when the BFR procedures are started) should be controlled in the BFR procedures.

For example, if the monitoring of a specific DCI is stopped in the BFR procedures, the user terminal may be unable to perform the behaviors that relate to this specific DCI, and this might result in a decline in throughput. So, the present inventors have come up with the idea of enabling the use of behaviors that relate to a specific DCI even in the BFR procedures, and preventing the decline of throughput by continuing the monitoring of this specific DCI even in the BFR procedures, or by defining the behaviors for when the monitoring of this specific DCI is stopped in the BFR procedures (first example).

Also, the present inventors have focused on the fact that, if a user terminal stops a timer (for example, a MAC layer timer (MAC timer)) that is active (not expired) when the BFR procedures are started, even if the BFR succeeds, it may not be possible to maintain sufficient data rates after the BFR. So, the present inventors have come up with the idea of maintaining the data rate after successful BFR by allowing that timer to run normally even in the BFR procedures (second example).

Now, embodiments of the present invention will be described below in detail with reference to the accompanying drawings. The higher layer as used in the following description will refer to the MAC layer, but this is by no means limiting. In the following embodiments, higher layer signaling may be, for example, one of RRC signaling, MAC signaling, broadcast information and so forth, or a combination of these.

Also, for example, MAC control elements (MAC CEs (Control Elements)), the MAC PDU (Protocol Data Unit) and so forth may be used in MAC signaling. The broadcast information may include, the master information block (MIB), system information blocks (SIBs), for example, system information (RMSI (Remaining Minimum System Information and/or OSI (Other System Information)) and so on. Physical layer signaling may involve, for example, downlink control information (DCI).

First Embodiment

With a first embodiment of the present invention, control of monitoring of a specific DCI (PDCCH) in the BFR procedures will be described. A user terminal may maintain monitoring a specific DCI in the BFR procedures (first monitoring control), or may not be allowed to monitor this specific DCI (second monitoring control).

According to the first embodiment, the user terminal transmits a BFR request signal (a recovery request signal in response to a beam failure) to a radio base station. Furthermore, the user terminal receives a BFR response signal (a response signal in response to the recovery request signal) from the radio base station.

The beam failure recovery (BFR) procedures include, at least, transmitting a BFR request signal to a radio base station and receiving a BFR response signal from the radio base station. The BFR procedures may include at least one of the processes of steps S102 to S106 in FIG. 1.

Also, the BFR procedures may include processes related to information (for example, a beam failure instance indicator) that is transmitted and/or received between the physical layer (L1, PHY layer) and a higher layer (the MAC layer and/or the RRC layer) in the user terminal.

The "start" of the BFR procedures may refer to the timing at which a predetermined indication (for example, a beam failure instance indicator) is transmitted from the PHY layer of the user terminal to a higher layer (the MAC layer or the RRC layer) based on an assessment result of one or more BF detection resources' radio link quality. Alternatively, the "start" of the BFR procedures may be the timing at which transmission of a BFR request to the radio base station is triggered in a higher layer (for example, the MAC layer) of the user terminal.

Also, the "success" or the "end" of the BFR procedures may be the timing at which a BFR response signal is received based on a predetermined PDCCH that is detected in a predetermined window (also referred to as a "response window," a "gNB window," etc.), or may be the timing at which link reconfiguration is completed based on information (for example, the BF detection resource information and/or candidate beam information that have been described earlier) included in the BFR response signal.

Furthermore, the "failure" or the "end" of the BFR procedures may refer to the case in which no BFR response signal can be received in a predetermined window (also referred to as a "response window," a "gNB window," etc.), or refer to the case in which no new candidate beams can be detected.

<First Monitoring Control>

In the first monitoring control, the user terminal maintains monitoring a specific DCI (for example, at least one of the DCIs (PDCCHs) of (1) to (3), which will be described later) in the BFR procedures. That is, regardless of the start and/or the success of the BFR procedures, the user terminal maintains monitoring the specific DCI the user terminal monitored before the BFR procedures were started.

Meanwhile, in the first monitoring control, the user terminal may not be allowed to monitor another DCI (for example, at least one of the DCIs (PDCCHs) of (4) and (5), which will be described later) in the BFR procedures, or the user terminal may maintain monitoring that another DCI.

Figure 2:
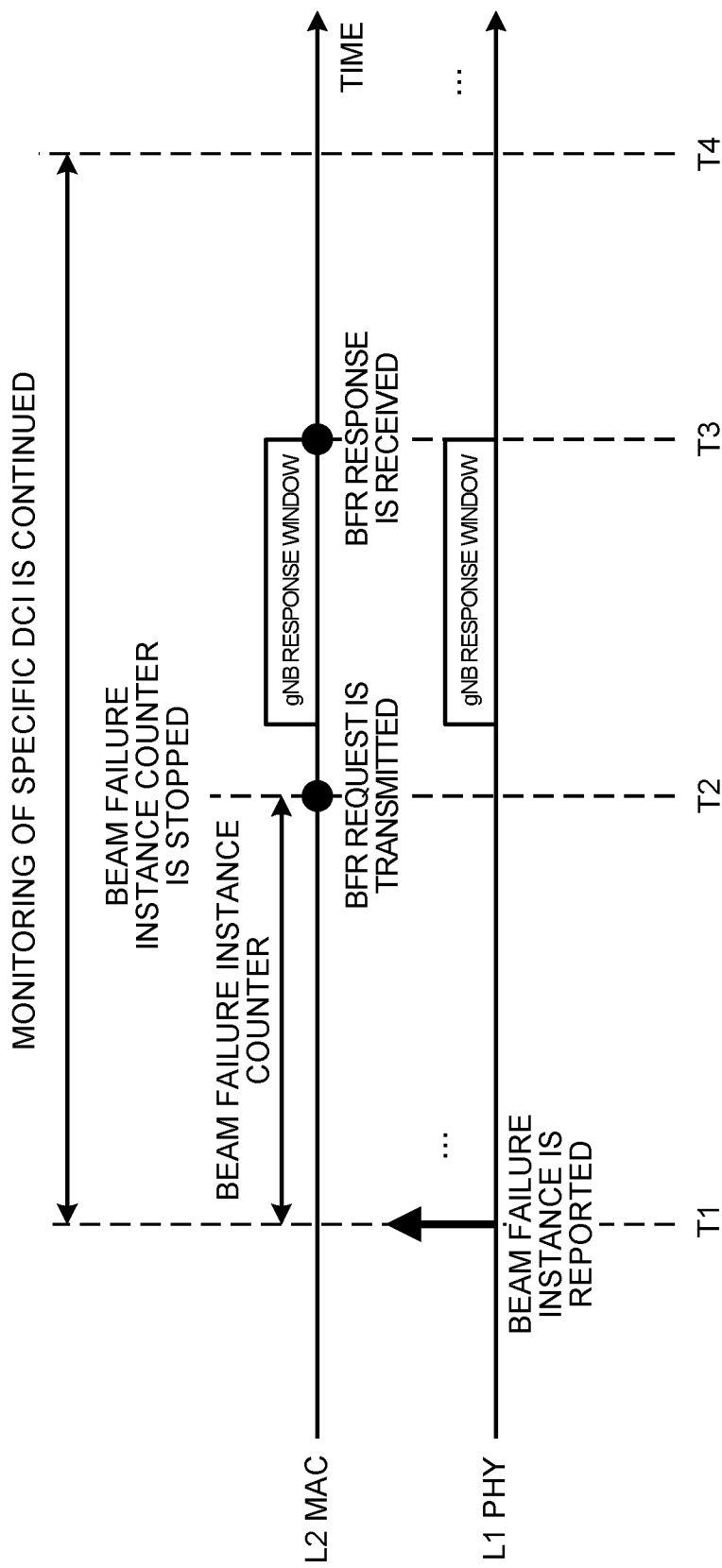
FIG. 2 is a diagram to show an example of first monitoring control according to a first embodiment of the present invention.

FIG. 2 is a diagram to show an example of first monitoring control according to the first embodiment. In FIG. 2, at time T1, the PHY layer of the user terminal detects a beam failure when a predetermined condition is fulfilled (for example, when the radio link quality of all the BF detection resources in a set is poorer than a predetermined threshold (for example, $Q_{out,LR}$)), and transmits a beam failure instance indicator to the MAC layer.

The beam failure instance indicator may be reported in the PHY layer or the MAC layer, in a predetermined cycle. In this case, the beam failure instance indicator may include information about whether there is a beam failure or not, and/or information about whether there is a new candidate beam or not.

The MAC layer of the user terminal counts beam failure instances using a predetermined counter (for example, a beam failure instance counter), based on the beam failure instance indicators from the PHY layer. When the MAC layer receives a beam failure instance indicator that indicates the occurrence of a beam failure from the PHY layer, the MAC layer increments the predetermined counter by a predetermined value (for example, +1).

Furthermore, the MAC layer of the user terminal may trigger the transmission of a BFR request when the value on the predetermined counter becomes greater than or equal to, or exceeds, a predetermined threshold. For example, in FIG. 2, the beam failure instance counter becomes greater than or equal to, or exceeds, a predetermined threshold at time T2, so that the MAC layer may report a command for transmitting a BFR request (trigger information) to the PHY layer. Note that the above beam failure may be detected by the MAC layer when a BFR request is triggered.

Also, a timer for beam failure instances (which may also be referred to as "beam failure instance timer") may be used with or instead of the beam failure instance counter. If the beam failure instance timer is not active when a beam failure instance indicator, which indicates the occurrence of a beam failure, is received, the MAC layer of the user terminal may start the timer. The MAC layer may trigger a BFR request when the timer expires.

At time T2 in FIG. 2, the PHY layer of the user terminal transmits a BFR request to the radio base station based on the above trigger. This BFR request may include information that relates to one or more new candidate beams (new candidate beam information), and this information may be selected by the PHY layer (based on, for example, the measured quality of the new candidate beams), or may be selected based on a report from the MAC layer.

The PHY layer of the user terminal monitors the DCI that schedules the BFR response signal in a predetermined window (gNB response window) configured by a higher layer. Referring to FIG. 2, this DCI is detected in the window at time T3.

The user terminal reconfigures the links based on this BFR response signal. To be more specific, the user terminal reconfigures the links based on the BF detection resource information and/or the candidate beam information included in the BFR response signal. In FIG. 2, the user terminal may transmit a link reconfiguration completion message to the radio base station at time T4.

In FIG. 2, the detection of a beam failure by the PHY layer of the user terminal at time T1 up to the link reconfiguration completion message at time T4 are the BFR procedures, but this is by no means limiting. The BFR procedures have only to include, at least, the transmission of a BFR request to the radio base station at time T2, and the receipt of a BFR response from the radio base station at time T3.

As shown in FIG. 2, the user terminal (or the PHY layer of the user terminal) may maintain monitoring a specific DCI in the BFR procedures. Here, the specific DCI may be, for example, at least one of the following (1) to (3):

(1) DCI (for example, DCI format 2_0, DCI format 2A, etc.) to include information (slot format indicator (SFI)) that indicates the slot format. In the above BFR procedures, the user terminal maintains monitoring (1) the DCI including an SFI, so that the user terminal can identify, based on this DCI, in which direction (uplink or downlink) a predetermined time division duplexing (TDD) slot is communicated. To be more specific, the user terminal can dynamically identify the communicating direction of a slot that is configured "flexible" by higher layer signaling, based on this DCI.

(2) DCI (for example, DCI format 2_2, DCI format 2C including a TPC command) to include a transmission power control (TPC) command for at least one of the PUCCH and the PUSCH. In the above BFR procedures, the user terminal maintains monitoring (2) the DCI including a TPC command, so that the user terminal can properly control the transmission power of the PUCCH or the PUSCH transmitted in the BFR procedures.

(3) DCI (common DCI) that is common to a group of one or more user terminals, or to all the user terminals (for example, at least one of DCI for system information (for example, RMSI and/or OSI), DCI for paging, and DCI for random access (RA)). This common DCI may be allocated to a common search space (CSS).

In addition, CRC bits that are scrambled (masked) by using identifiers (for example, SI-RNTI, P-RNTI and RA-RNTI) that are different from the identifiers (for example, C-RNTI) that are used to scramble the CRC bits of user terminal-specific DCIs may be appended to each of the DCI for system information, the DCI for paging and the DCI for RA.

In the above BFR procedures, the user terminal maintains monitoring (3) the common DCI, so that the user terminal can adequately exert control (for example, initial access, paging, random access, etc.) that is common to a group of one or more user terminals, or to all the user terminals.

Meanwhile, in FIG. 2, the user terminal (or the PHY layer of the user terminal) may stop or maintain monitoring other DCIs in the above BFR procedures. These other DCIs may include at least one of the following (4) and (5):

(4) DCI to include an indication (pre-emption indication) of a specific resource (for example, a resource where it is possible to assume that no PDSCH is transmitted to the user terminal, or a resource where the transmission of the PUSCH from the user terminal is stopped) (for example, DCI format 2_1, DCI format 2B, etc.).

(5) DCI to use to transmit an uplink reference signal (for example, a sounding reference signal (SRS)) (for example, DCI format 2_3, DCI format 2D, etc.).

Note that whether or not to stop (whether or not to maintain) the monitoring of other DCIs in the above BFR procedures may be determined in the specification, or may depend on the implementation of the user terminal.

The user terminal may assume that the search space for monitoring the above specific DCI that keeps being monitored in the BFR procedures is associated with the CORESET that is monitored in the BFR procedures (CORESET-BFR). That is, the user terminal may assume that the search space for monitoring the above specific DCI that keeps being monitored in the BFR procedures is not associated with a CORESET that is different from the CORESET-BFR monitored in the BFR procedures. This allows the user terminal to perform the PDCCH receiving and decoding processes for only one CORESET, so that the processing load on the user terminal can be reduced.

Alternatively, the user terminal may assume that the search space for monitoring the above specific DCI that keeps being monitored in the BFR procedures is in some cases associated with a CORESET that is different from the CORESET-BFR. That is, if the search space for monitoring the above specific DCI that keeps being monitored in the BFR procedures is associated with a CORESET that is different from the CORESET-BFR that is monitored in the BFR procedures, the user terminal monitors the DCI based on one or more CORESETs. In this case, it is no longer necessary to limit the CORESETs for monitoring the above specific DCI to the CORESET-BFR, so that the flexibility of scheduling, configuration and so forth can be improved.

According to the first monitoring control, a specific DCI (for example, at least one of the DCIs (PDCCHs) of above (1) to (3)) maintains being monitored in the BFR procedures, so that the user terminal can properly exert control based on this specific DCI, and prevent the decline of throughput.

<Second Monitoring Control>

Second monitoring control is different from the first monitoring control in that the user terminal is not allowed to monitor the above-described specific DCI (for example, at least one of the DCIs (PDCCHs) of (1) to (3) above) in the BFR procedures. By this means, the second monitoring control can simplify the behaviors of the user terminal in the BFR procedures compared to the first monitoring control. Hereinafter, differences from the first monitoring control will be primarily described.

Figure 3:
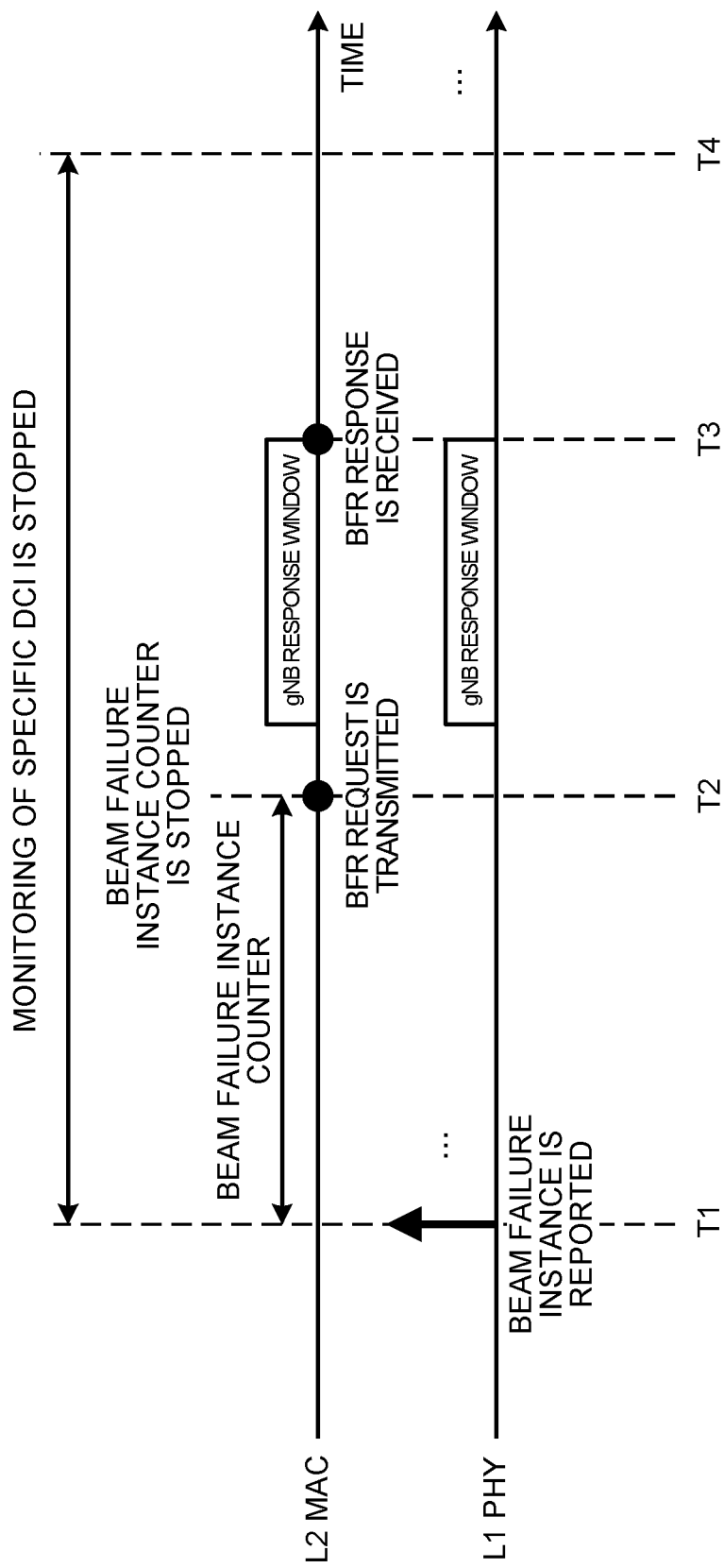
FIG. 3 is a diagram to show an example of second monitoring control according to the first embodiment.

FIG. 3 is a diagram to show an example of second monitoring control according to the first embodiment. In FIG. 3, the user terminal stops monitoring the above specific DCI (for example, at least one of the DCIs of (1) to (3) above) in the BFR procedures (for example, it is sufficient to at least include, between times T1 and T4, transmitting a BFR request to the radio base station at time T2, and receiving a BFR response from the radio base station at time T3).

In the above BFR procedures, when stopping monitoring (1) the DCI including an SFI, the user terminal cannot dynamically identify the communicating direction of predetermined TDD slots (for example, slots that are configured "flexible" by higher layer signaling) based on this DCI.

Consequently, in the BFR procedures, the user terminal may assume that predetermined time resources (for example, all slots) in a predetermined frequency field (for example, a carrier, a component carrier, a cell, or a bandwidth part that is configured for the carrier (BWP)) are configured "flexible (or "X," or "unknown")" by higher layer signaling. In resources that are configured as "flexible (or "X," or "unknown")" by higher layer signaling, the user terminal can perform at least some or all of the following behaviors:

Receiving PDSCH/CSI-RS indicated by DCI with CRC masked by C-RNTI, or transmitting PUSCH/PUCCH/PRACH;

Transmitting SRS indicated by DCI with CRC masked by TPC-SRS-RNTI; and

Receiving PDCCH/PDSCH/CSI-RS configured by higher layer signaling, or transmitting SRS/PUCCH/PUSCH.

In addition, in the above BFR procedures, the user terminal may assume behaving in the same way as when no DCI to include an SFI can be detected (received). To be more specific, when the user terminal fails to detect DCI that includes an SFI, the user terminal may understand that the time resources not specified by an SFI that is detected are resources that are configured as "flexible" (or "X," or "unknown") by higher layer signaling.

Also, when the user terminal fails to detect DCI that includes an SFI, the user terminal may assume that the time resources not specified by an SFI that is detected are resources that are specified as "flexible" (or "X," or "unknown") by the SFI. In resources that are specified as "flexible" (or "X," or "unknown") by an SFI, the user terminal can perform at least some or all of the following behaviors:

Receiving PDSCH/CSI-RS indicated by DCI with CRC masked by C-RNTI, or transmitting PUSCH/PUCCH/PRACH.

Furthermore, the user terminal may determine the communicating direction of a slot that is configured "flexible" by higher layer signaling, based on DCI that is communicated in the above BFR procedures (for example, DCI to schedule the PDSCH that communicates the BFR response signal). Alternatively, the communicating direction of this slot may be associated with a predetermined resource (for example, a RACH resource), and the user terminal may determine the communicating direction of the slot based on that predetermined resource.

According to the second monitoring control, the user terminal behaves properly even when the user terminal is not allowed to monitor a specific DCI (for example, at least one of the DCIs (PDCCHs) of (1) to (3) above) in the BFR procedures, so that the decline in throughput can be prevented.

Second Embodiment

With a second embodiment of the present invention, control of MAC timers in the BFR procedures will be described. The user terminal may keep specific MAC timers active in the BFR procedures.

The specific MAC timers may include, for example, at least one of a timing advance (TA) timer, a timer (HRAQ-RTT timer) for controlling the round-trip time of delivery acknowledgment information (also referred to as "HARQ (Hybrid Automatic Repeat reQuest)-ACK," "ACK/NACK," etc.) in response to data, and a timer (DRX timer) for controlling discontinuous reception (DRX).

Here, the TA timer is started by a TA command included in the random access response (message 2). When this TA timer expires, uplink resources reserved for the user terminal are released. The TA timer is also referred to as a "TAT," a "timing advance timer," or a "time alignment timer."

The HARQ-RTT timer may be a timer to show the time it takes after data is transmitted, until an HARQ-ACK is received.

The DRX timer may be at least one of a timer to show the "ON" duration in the DRX cycle (ON duration timer, or "onDurationTimer"), and a timer to show a predetermined period after a PDCCH is successfully received (inactivity timer, or "drx-InactivityTimer").

Figure 4:
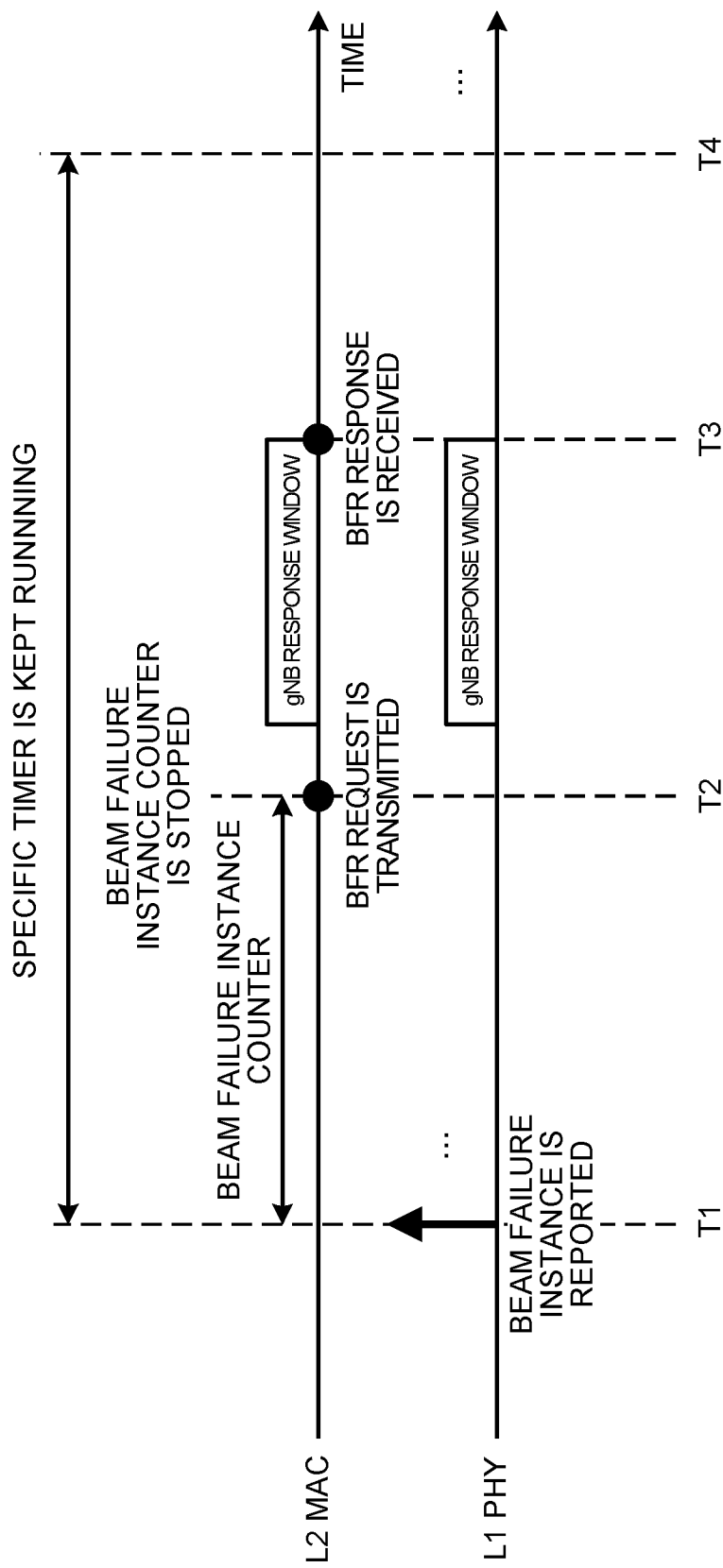
FIG. 4 is a diagram to show an example of MAC timer activation control according to a second embodiment of the present invention.

FIG. 4 is a diagram to show an example of MAC timer activation control according to a second embodiment. As shown in FIG. 4, if a MAC timer (at least one of the above TA timer, HARQ-RTT timer, and DRX timer) is active when the BFR procedures are started (for example, at time T1), the user terminal may keep the timer active in the BFR procedures until the MAC timer expires.

According to the second embodiment, a specific MAC timer is kept running in the BFR procedures, so that the user terminal can exert proper control based on this specific MAC timer, and prevent the decrease in data rates.

Note that, according to the second embodiment, the user terminal may stop or maintain other active timers in the BFR procedures. Note that whether or not to stop (or whether or not to maintain) one or more active timers (including the above specific MAC timer) in the BFR procedures may be determined in the specification, or may depend on the implementation of the user terminal.

(Radio Communication System)

Now, the structure of a radio communication system according to the present embodiment will be described below. In this radio communication system, communication is performed using at least one of the above examples or a combination of these.

Figure 5:
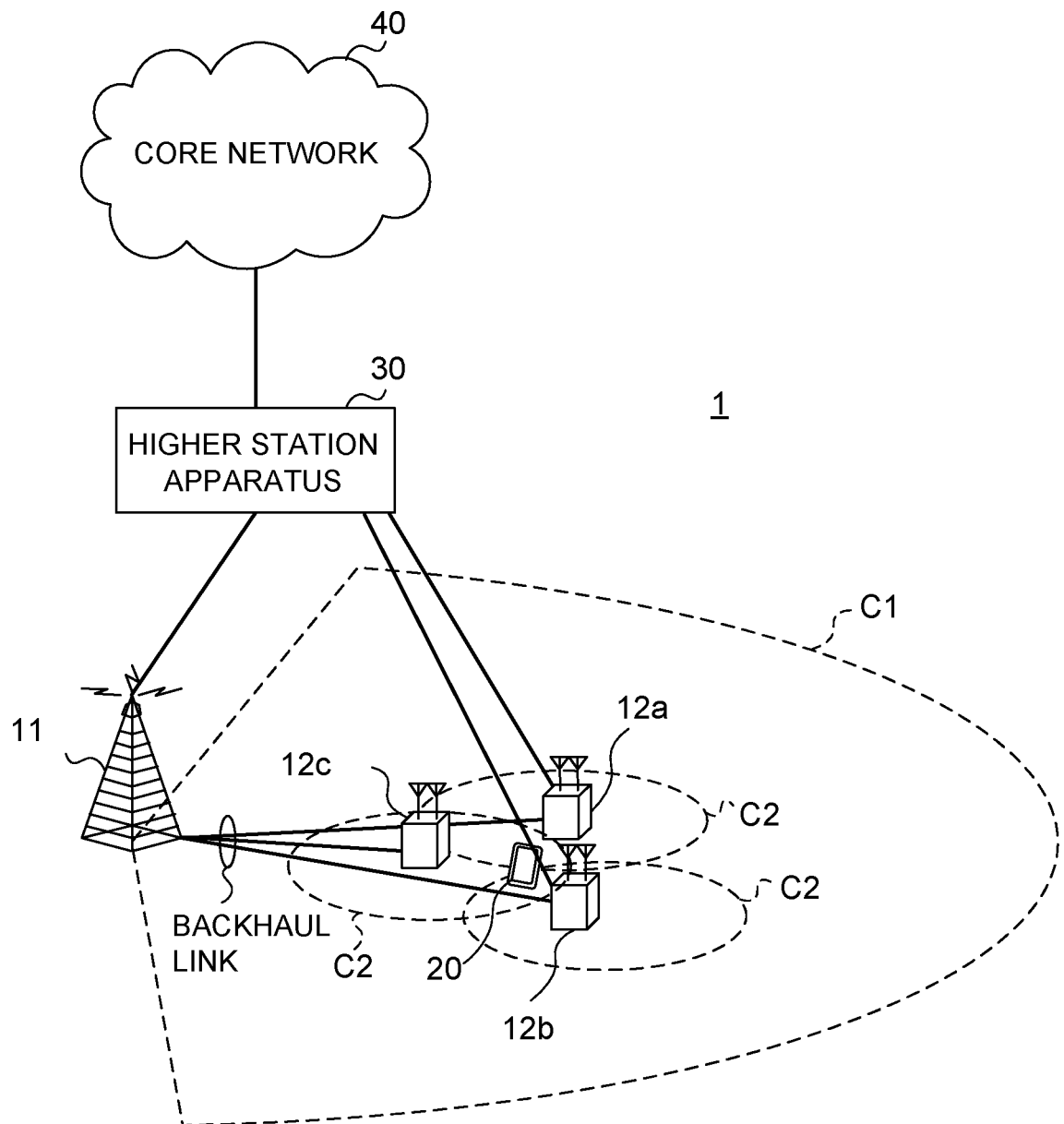
FIG. 5 is a diagram to show an exemplary schematic structure of a radio communication system according to the present embodiment.

FIG. 5 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long-term evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 and so forth are not limited to those illustrated in the drawings.

The user terminals 20 can connect with both the radio base station 11 and the radio base stations 12. The user terminals 20 might use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

A numerology may refer to a communication parameter that is applied to transmission and/or receipt of a given signal and/or channel, and represent at least one of the subcarrier spacing, the bandwidth, the duration of symbols, the length of cyclic prefixes, the duration of subframes, the length of TTIs, the number of symbols per TTI, the radio frame configuration, the filtering process, the windowing process, and so on.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The L1/L2 control channels include at least one of DL control channels (such as a PDCCH (Physical Downlink Control CHannel) and/or an EPDCCH (Enhanced Physical Downlink Control CHannel)), a PCFICH (Physical Control Format Indicator CHannel), and a PHICH (Physical Hybrid-ARQ Indicator CHannel). Downlink control information (DCI), which includes PDSCH and/or PUSCH scheduling information and so on, is communicated by the PDCCH.

Note that scheduling information may be reported in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 6:
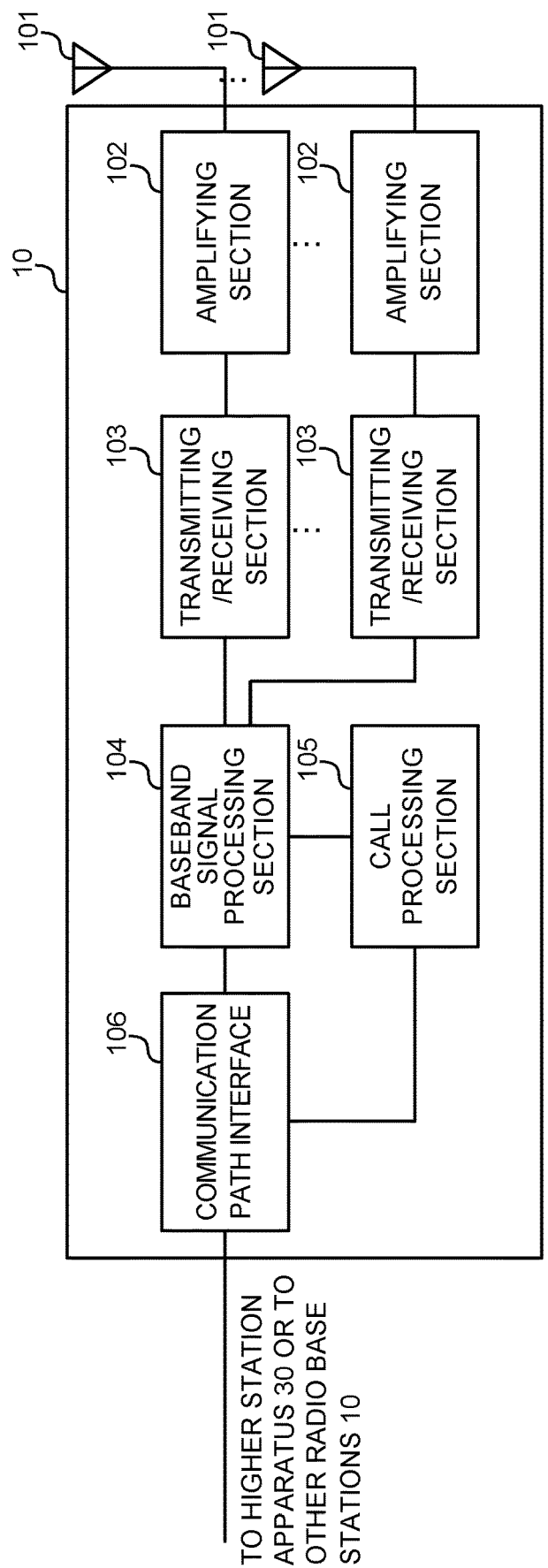
FIG. 6 is a diagram to show an exemplary overall structure of a radio base station according to the present embodiment.

FIG. 6 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base station 10, and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which this disclosure pertains. Furthermore, the transmitting/receiving antennas 101 may be constituted by, for example, array antennas. In addition, the transmitting/receiving sections 103 are designed so that single-BF or multiple-BF operations can be used.

The transmitting/receiving sections 103 may transmit signals by using transmitting beams, or receive signals by using receiving beams. Transmitting/receiving sections 103 may transmit and/or receive signals by using predetermined beams determined by control section 301.

Furthermore, the transmitting/receiving sections 103 may receive a BFR request signal (a beam failure recovery request signal) from the user terminal 20, and transmit a BFR response signal (a response signal in response to the recovery request signal) to the user terminal 20.

The transmitting/receiving sections 103 may receive various pieces of information described in each of the examples above, from the user terminal 20, or transmit these to the user terminal 20.

Figure 7:
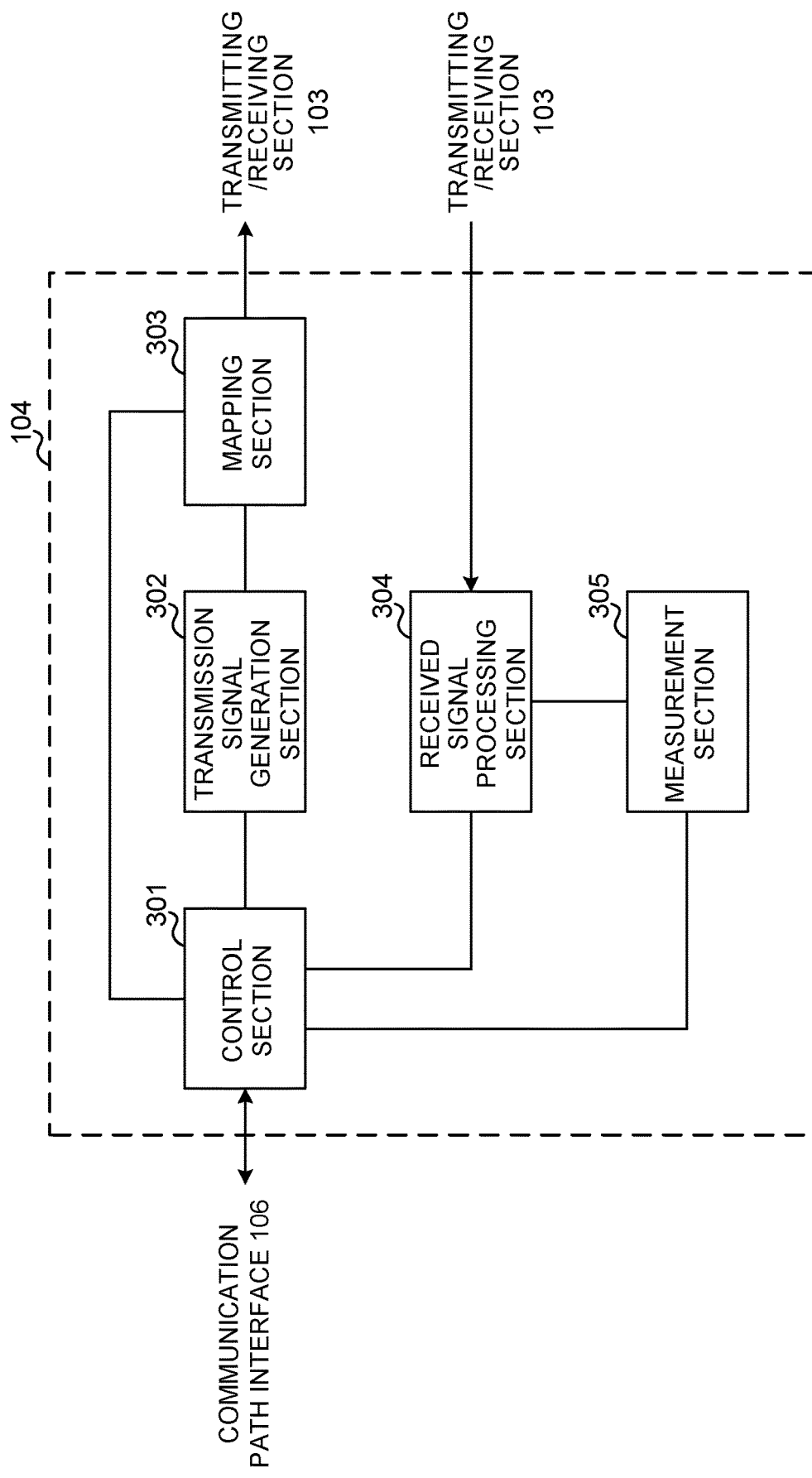
FIG. 7 is a diagram to show an exemplary functional structure of a radio base station according to the present embodiment.

FIG. 7 is a diagram to show an exemplary functional structure of a radio base station according to the present embodiment. Note that, although this example primarily shows functional blocks that pertain to characteristic parts of the present embodiment, the radio base station 10 might have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH), and downlink control signals (for example, signals transmitted in the PDCCH and/or the EPDCCH, such as delivery acknowledgment information). Also, the control section 301 controls the generation of downlink control signals, downlink data signals, and so on based on the results of deciding whether or not retransmission control is necessary for uplink data signals, and so on.

The control section 301 controls scheduling of synchronization signals (for example, PSS/SSS), downlink reference signals (for example, CRS, CSI-RS, DMRS, etc.) and the like.

The control section 301 may exert control so that transmitting beams and/or receiving beams are formed by using digital BF (for example, precoding) in the baseband signal processing section 104 and/or analog BF (for example, phase rotation) in the transmitting/receiving sections 103.

Based on configuration information related to radio link failure (RLF) and/or beam failure recovery (BFR), the control section 301 may control the configurations of RLF and/or BFR.

The control section 301 may control radio link monitoring (RLM) and/or beam failure recovery (BFR) for the user terminal 20. The control section 301 may exert control so that a BFR response signal is transmitted to the user terminal 20 in response to a BFR request signal.

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates, modulation schemes and the like that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), transmission path information (for example, CSI) and so on. The measurement results may be output to the control section 301.

(User Terminal)

Figure 8:
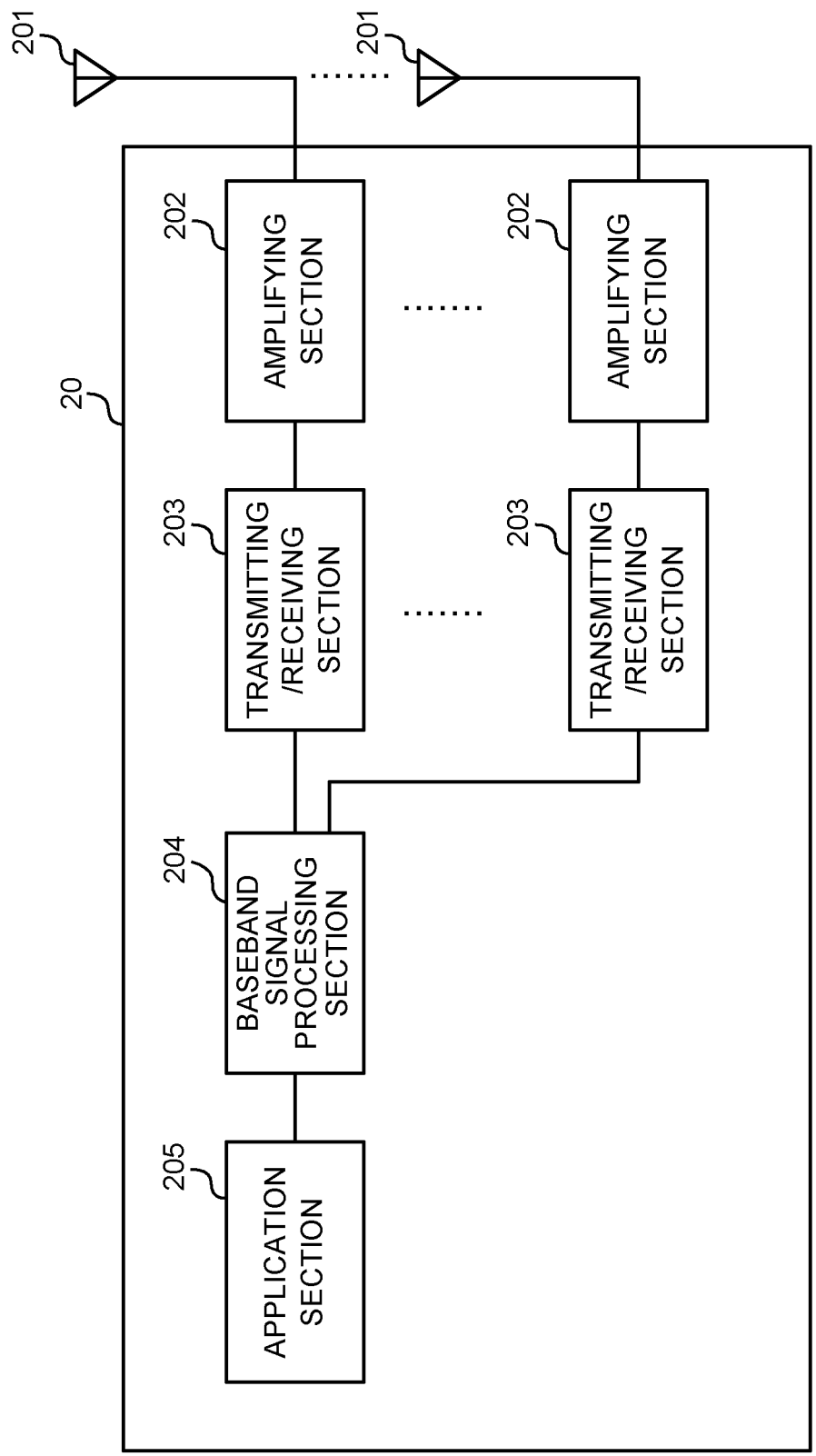
FIG. 8 is a diagram to show an exemplary overall structure of a user terminal according to the present embodiment.

FIG. 8 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving sections 203 can be constituted by transmitters/receivers, transmitting/receiving circuits or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may further have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which this disclosure pertains. Furthermore, the transmitting/receiving antennas 201 may be constituted by, for example, array antennas. In addition, the transmitting/receiving sections 203 are structured so that single-BF and multiple-BF can be used.

The transmitting/receiving sections 203 may transmit signals by using transmitting beams, or receive signals by using receiving beams. The transmitting/receiving sections 203 may transmit and/or receive signals by using predetermined beams selected by the control section 401.

The transmitting/receiving sections 203 may receive various pieces of information described in each of the examples above, from the radio base station 10, and/or transmit these to the radio base station 10. For example, the transmitting/receiving sections 203 may transmit a beam recovery request to the radio base station 10.

Also, the transmitting/receiving sections 203 may transmit a BFR request signal (a beam failure recovery request signal) to the radio base station 10, and receive a BFR response signal (a response signal in response to the recovery request signal) from the radio base station 10.

Figure 9:
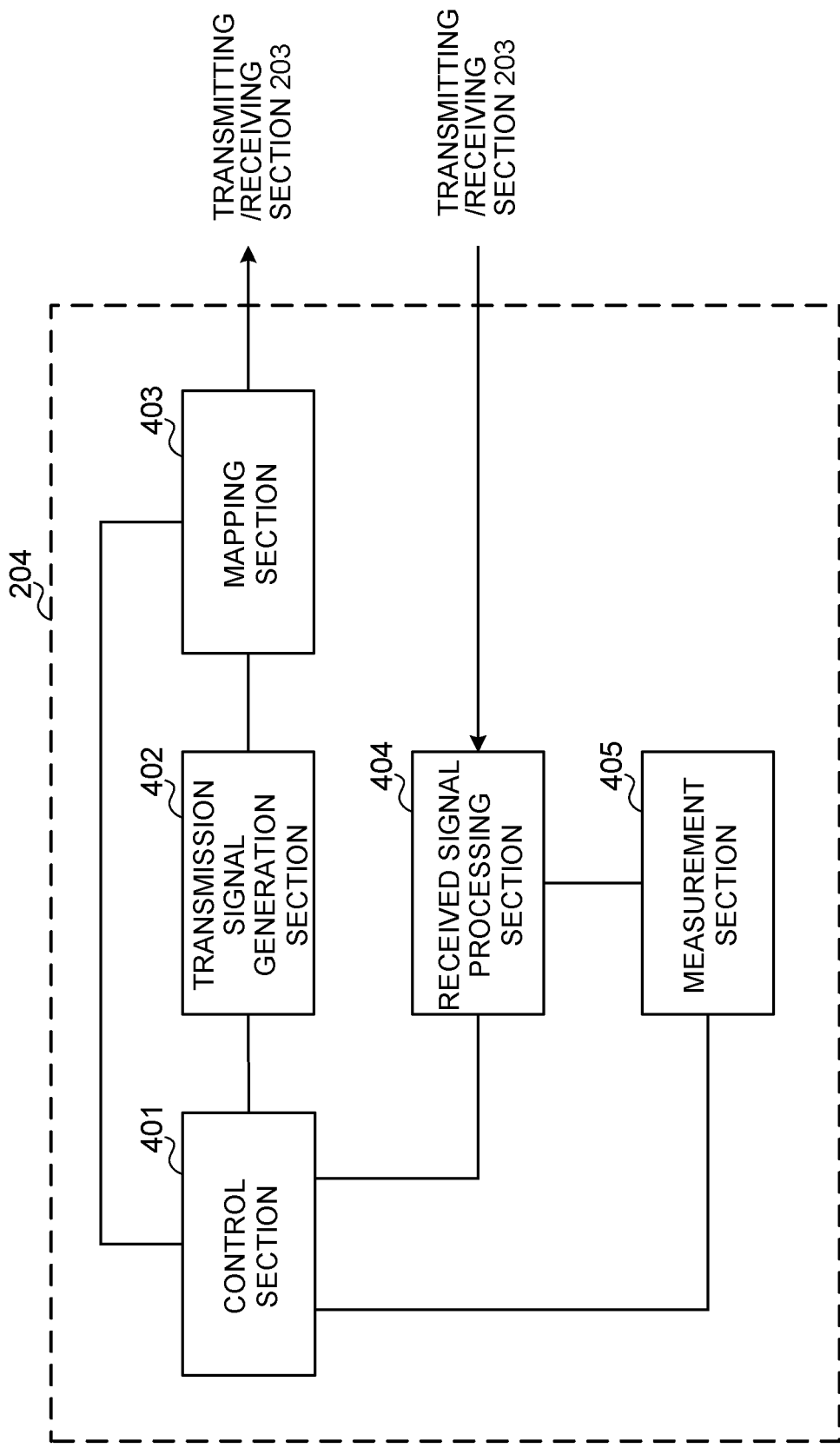
FIG. 9 is a diagram to show an exemplary functional structure of a user terminal according to the present embodiment.

FIG. 9 is a diagram to show an exemplary functional structure of a user terminal according to the present embodiment. Note that, although this example primarily shows functional blocks that pertain to characteristic parts of present embodiment, the user terminal 20 might have other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

The control section 401 may exert control so that transmitting beams and/or receiving beams are formed by using digital BF (for example, precoding) in the baseband signal processing section 204 and/or by using analog BF (for example, phase rotation) in the transmitting/receiving sections 203.

The control section 401 may control radio link monitoring (RLM) and/or beam failure recovery (BFR) based on measurement results in the measurement section 405.

The control section 401 may include a MAC layer processing section and a PHY layer processing section. Note that, the MAC layer processing section and/or the PHY layer processing section may be implemented by one of the control section 401, the transmission signal generation section 402, the mapping section 403, the received signal processing section 404, and the measurement section 405, or by a combination of these.

The MAC layer processing section performs MAC layer processing, and the PHY layer processing section performs PHY layer processing. For example, downlink user data and broadcast information input from the PHY layer processing section may be output to a higher layer processing section that performs RLC layer processing, PDCP layer processing and so forth, through the processing in the MAC processing section.

The PHY layer processing section may detect beam failures. The PHY layer processing section may report information about detected beam failures to the MAC layer processing section.

The MAC layer processing section may trigger the transmission of beam recovery requests in the PHY layer processing section. For example, the MAC layer processing section may trigger the transmission of a BFR request signal based on information related to beam failures, which is reported from the PHY layer processing section.

The information related to beam failures may include information about whether or not there is a beam failure (or a beam failure instance), and/or about whether or not there is a new candidate beam.

The above MAC layer processing section may count on a predetermined counter (beam failure instance counter) based on the beam failure-related information reported from the above PHY layer processing section, and trigger the PHY layer processing section for the transmission of the above-mentioned BFR request signal when the value on the counter reaches or exceeds a predetermined threshold.

The above MAC layer processing section may control a beam recovery timer that is associated with the period in which the beam recovery procedures can be performed, based on whether or not there is a response to the beam recovery request.

If there is a response to the beam recovery request (that is, a gNB response is received in a gNB response window) and the beam recovery timer is running, the MAC layer processing section may stop the beam recovery timer.

The control section 401 may control link reconfiguration based on the BFR response signal from the radio base station 10. To be more specific, the control section 401 may reconfigure the set of BF detection resources and the set of resources for measuring candidate beams.

The control section 401 may control BFR procedures, which at least include transmitting a BFR request signal and receiving a BFR response signal, as described above. The BFR procedures may include at least one of steps S102 to S106 in FIG. 1, which have been described earlier. Furthermore, the BFR procedures can include the processes in at least one of the PHY layer processing section and/or the MAC layer processing section.

The control section 401 controls the monitoring of downlink control information (for example, the blind decoding in search spaces in CORESETs). To be more specific, in the above BFR procedures, specific downlink control information may be kept being monitored (the first embodiment and the first monitoring control). This specific downlink control information may be at least one of downlink control information to include an indicator that shows the slot format, downlink control information to include a transmission power control command for at least one of an uplink control channel and an uplink shared channel, and downlink control information that is common to a group of one or more user terminals or to all the user terminals.

In the above BFR procedures, if monitoring of downlink control information to include a slot format indicator is not allowed, the control section 401 may determine the slot format based on at least one of higher layer signaling, downlink control information for scheduling the response signal, and the resource for random access (the first embodiment and the second monitoring control).

The control section 401 controls the activation and/or the expiration of a predetermined timer. If a MAC (Medium Access Control) layer timer is active when the BFR procedures are started, the timer may be kept running until the timer expires (second embodiment). The specific timer may be at least one of a timer that is started by a timing advance command included in a random access response, a timer for controlling the round-trip time of delivery acknowledgment information in response to data, and a timer for controlling discontinuous reception.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generation apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Structure)

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 10:
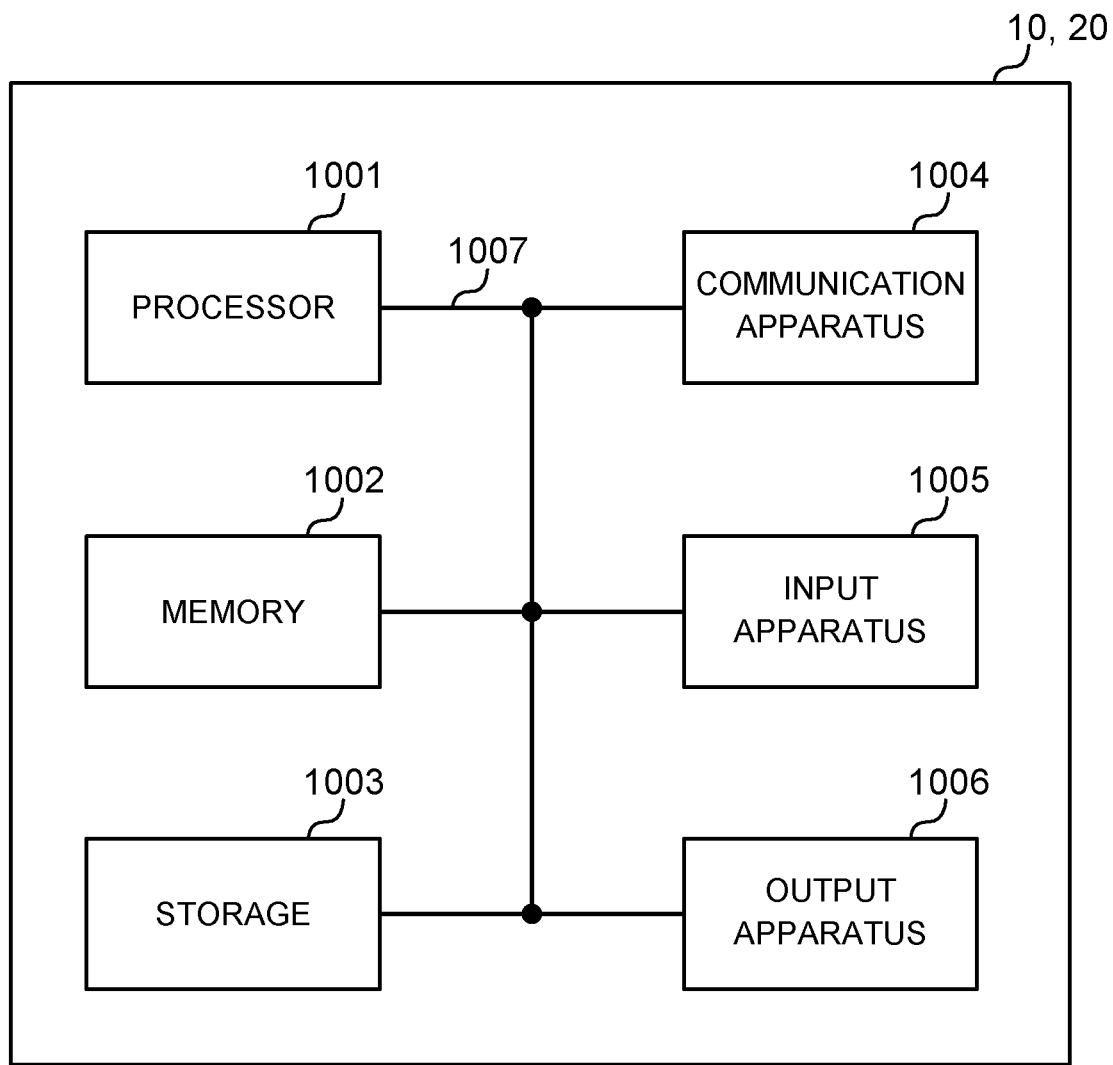
FIG. 10 is a diagram to show an exemplary hardware structure of a radio base station and a user terminal according to the present embodiment.

For example, the radio base station, user terminals, and so on according to the present embodiment may function as a computer that executes the processes of each example of the present embodiment. FIG. 10 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. Note that, the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read predetermined software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and so on for implementing the radio communication methods according to the present embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or multiple slots in the time domain. A subframe may be a fixed time duration (for example, 1 ms), which does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or one minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information and parameters described in this specification may be represented in absolute values or in relative values with respect to predetermined values, or may be represented using other applicable information. For example, a radio resource may be indicated by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on). Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

Furthermore, the radio base stations in this specification may be interpreted as user terminals. For example, the examples/embodiments of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long-term evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present invention defined based on the recitations of claims. Consequently, the description herein is provided only for the purpose of explaining examples, and should by no means be construed to limit the invention concerning this disclosure in any way.

The invention claimed is:

1. A terminal in communication with a base station comprising:
    a transmitter that transmits a beam failure recovery request signal to the base station; and
    a processor that maintains, in a beam failure recovery procedure including the transmission of the beam failure recovery request signal, monitoring of downlink control information for a random access,
    wherein if at least one medium access control (MAC) layer timer has been running before the beam failure recovery procedure is started, then the processor maintains the running of the at least one MAC layer timer until the at least one MAC layer timer expires, and
    wherein the at least one MAC layer timer comprises a timer for controlling a round-trip time of delivery acknowledgement information in response to data.

2. The terminal according to claim 1, wherein a search space for monitoring the downlink control information in the beam failure recovery procedure is associated with a control resource set (CORESET) for the beam failure recovery procedure, and is not associated with a CORESET that is different from the CORESET for the beam failure recovery procedure.

3. The terminal according to claim 1, wherein the at least one MAC layer timer comprises a timer started by a timing advance command included in a random access response.

4. A radio communication method for a terminal in communication with a base station, comprising:
    transmitting a beam failure recovery request signal to the base station; and
    maintaining, in a beam failure recovery procedure including the transmission of the beam failure recovery request signal, monitoring of downlink control information for a random access,
    wherein if at least one medium access control (MAC) layer timer has been running before the beam failure recovery procedure is started, then maintaining the running of the at least one MAC layer timer until the at least one MAC layer timer expires, and wherein the at least one MAC layer timer comprises a timer for controlling a round-trip time of delivery acknowledgement information in response to data.

5. A system comprising:
a terminal in communication with a base station that comprises:
   a transmitter that transmits a beam failure recovery request signal to the base station; and
   a processor that maintains, in a beam failure recovery procedure including the transmission of the beam failure recovery request signal, monitoring of downlink control information for a random access,
   wherein if at least one medium access control (MAC) layer timer has been running before the beam failure recovery procedure is started, then the processor maintains the running of the at least one MAC layer timer until the at least one MAC layer timer expires, and
   wherein the at least one MAC layer timer comprises a timer for controlling a round-trip time of delivery acknowledgement information in response to data; and
the base station that comprises:
   a receiver that receives the beam failure recovery request signal from the terminal.

6. The terminal according to claim 1, wherein the at least one MAC layer timer comprises a timer for controlling discontinuous reception.

* * * * *